UNITED STATES PATENT OFFICE.

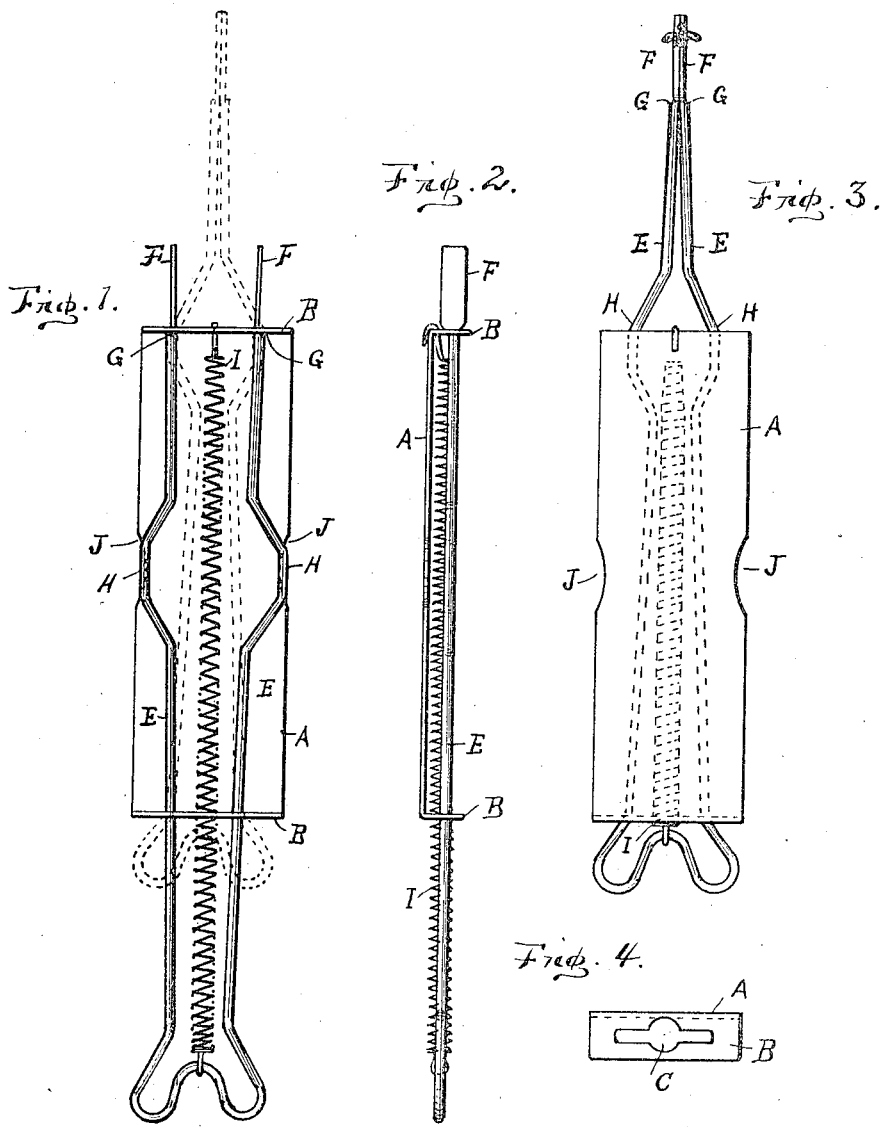

NATHAN B. HOLDSWORTH, OF FORT WAYNE, INDIANA.

FLYCATCHER.

1,289,175. Specification of Letters Patent. Patented Dec. 31, 1918.

Application filed May 13, 1918. Serial No. 234,109.

*To all whom it may concern:*

Be it known that I, NATHAN B. HOLDSWORTH, a citizen of the United States of America, and resident of Fort Wayne, in the county of Allen and State of Indiana, have invented certain new and useful Improvements in Flycatchers, of which the following is a specification.

This invention relates to improvements in fly catchers and the object thereof is to provide an instrument by means of which flies may be killed by crushing them and without soiling napery or other object upon which they are found.

The object of the invention is accomplished by the construction illustrated in the accompanying drawings, in which:—

Figure 1 is a bottom plan view of the device with the tongs set in readiness for operation;

Fig. 2 is a side elevation of Fig. 1;

Fig. 3 is a top plan view of the same with the tongs in position after operation; and Fig. 4 is an end view of the handle.

Similar characters of reference indicate corresponding parts throughout the several views, and having reference now to the same.

A is a handle comprised of a plate with its ends B turned crosswise, each end having a slot C therein shaped substantially as shown in Fig. 4. A pair of tongs D are slidingly mounted in the handle, the arms E thereof extending through the slots C in its ends B. The forward end of each arm E is flattened so that a blade F is thereby formed, and has also an offset G at the juncture of the blade and arm proper. There is also formed in each arm an outwardly extending projection H formed by bending the arm.

A retracting spring I extends loosely through the slot C in the rear end of the handle and is secured at its forward end by extending the wire of which the spring is formed through the slot in the front end and bending it over the top of the handle. The rear end of the spring is hooked over the rear end of the tongs. The effect of the spring is to draw the tongs forwardly in the handle. The tongs are formed so that its arms tend inherently to spread apart, and the spread thereof is limited in extent by the slot in the front end of the handle through which they extend. When the tongs are drawn to their rearmost position, the offsets G engage against the inner face of the downturned front end B and the tongs thereby are locked in position ready for use. The handle has a recess J made in each side, and the projections H extend correspondingly beneath the recesses when the tongs are in locked position. When the tongs are moved to their forwardmost position, the projections enter the slot in the front end of the handle which causes the tongs to close so that the blades strike together at the conclusion of their forward movement. The tongs are released from their locked position by the operator by pressing the projections with the thumb and finger as the handle is held in the hand. The device is moved cautiously to a point within range of the objective fly, and the tongs are then released with the result that they spring forward and crush the object between its blades.

What I claim is:—

1. In a device of the class described, a handle having slotted ends; a pair of tongs slidingly mounted in the handle and having flattened ends and off-sets adapted to engage in the corresponding end of the handle, each arm of the tongs having an outwardly extending projection formed therein; and a retracting spring having connection at one end thereof with the handle and at the opposite end with the tongs, said off-sets being adapted to engage in the corresponding slotted end of the handle when the tongs are drawn into set position.

2. In a device of the class described, a handle; a pair of tongs slidingly mounted in connection therewith; and a retracting spring connected at one end thereof to the handle and at its opposite end with the tongs and adapted to move the latter relative thereto, each arm of the tongs having an outwardly extending projection adapted to have pressure applied thereto by the fingers of the operator to release the tongs from set position in the handle.

3. In a device of the class described, a handle having slotted depending ends; a pair of tongs extending through the slotted depending ends, the forward ends of the arms of the tongs being flattened and each having an off-set therein adapted to engage in the corresponding depending end of the handle, each arm of said tongs having also an outwardly extending projection adapted to have manual pressure applied thereto to release the off-sets from engagement with the end of the handle and also to cause the extended arms of the tongs to contact with each other when the tongs are thrown to their foremost position; and a retracting spring having connection at one end thereof with the handle and at its opposite end with the tongs.

In testimony whereof I affix my signature, in presence of two witnesses.

NATHAN B. HOLDSWORTH.

Witnesses:
WALTER G. BURNS,
MATILDA METTLER.

Copies of this patent may be obtained for five cents each, by addressing the "Commissioner of Patents, Washington, D. C."